Patented May 18, 1948

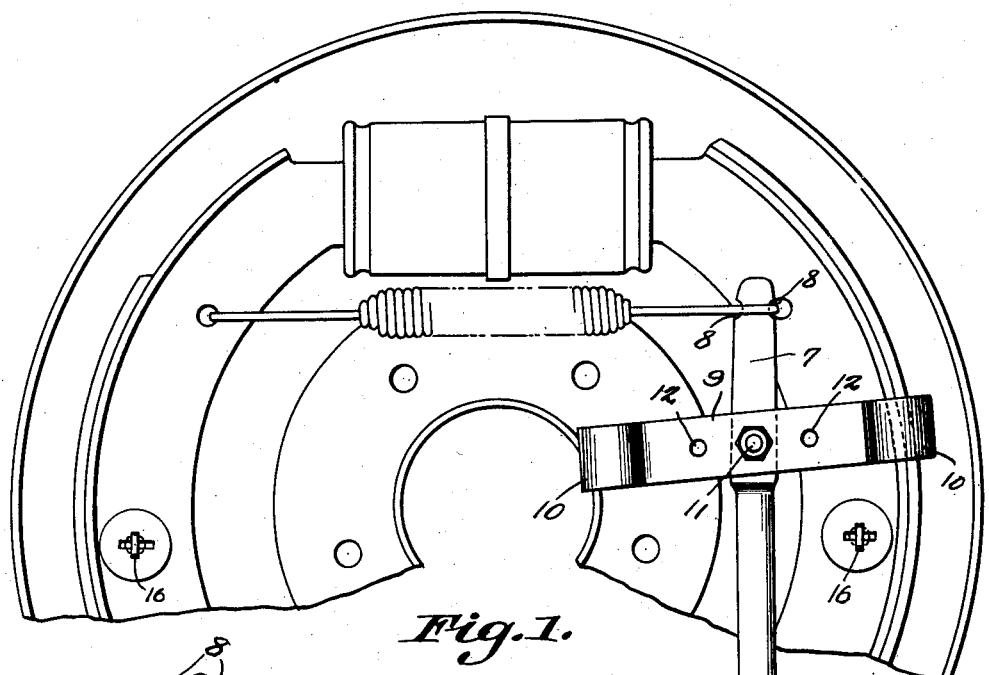
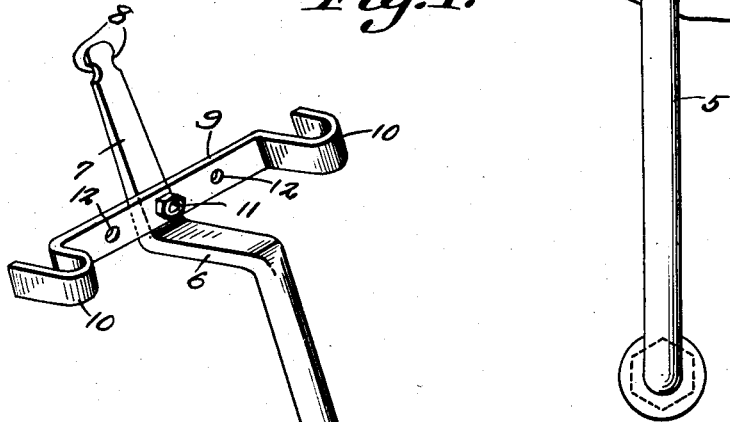
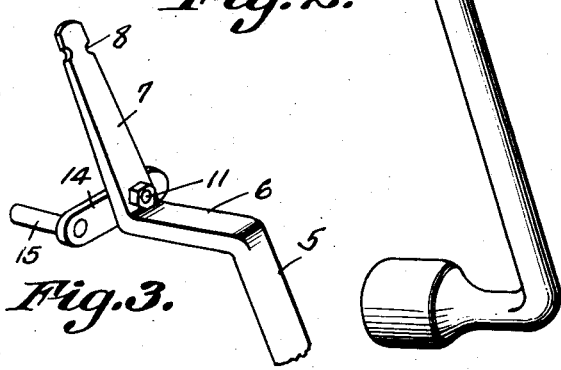

2,441,696

UNITED STATES PATENT OFFICE 2,441,696

SPRING REMOVING AND REPLACING TOOL

Jacob C. Feingold, Washington, D. C.

Application January 22, 1945, Serial No. 573,945

1 Claim. (Cl. 29—227)

This invention relates to a tool designed for removing and replacing contractile springs, and more particularly in removing and replacing springs of the type used in retracting motor vehicle brake shoes.

The primary object of the invention is to provide a tool of this character having means adapted to be positioned over one edge of a brake shoe to hold the tool against slipping, while the lever is being operated to stretch the spring so that one end of the spring may be readily lifted from the opening of the brake shoe, in which the end of the spring is held.

Another object of the invention is to provide a spring removing and replacing tool which may be operated to accomplish its purpose with facility when used in restricted places.

Still another object of the invention is to provide a tool for removing and replacing brake springs, which may be positioned for operation with either the right or left hand.

A further object of the invention is to provide a tool which may be adjusted for use in removing or replacing springs of various sizes, used with various sized brakes.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is a plan view showing the application of the tool.

Figure 2 is a perspective view of the tool.

Figure 3 is a perspective view of a modified form of tool retaining bar.

Referring to the drawing in detail, the tool comprises a bar which is formed with a handle 5 which may be of any desired length, the bar having an offset portion 6 and an end portion 7.

The end portion 7 is formed with notches 8 disposed adjacent to the free end thereof, which notches are constructed to receive the spring with which the tool is used, at a point adjacent to the hook of the spring, so that in operating the tool, the spring will not slip from the tool. The end portion 7 is beveled at its extremity, so that it may be readily slid between the spring and the brake shoe when positioning the tool.

Pivotally connected with the end portion 7, is a cross bar 9 that has its ends extended upwardly and downwardly providing hooks 10 that are adapted to hook over brake shoes in anchoring the tool, preparatory to operating the tool to expand a spring to be removed.

The reference character 11 indicates the pivot pin for the cross bar 9, which pin may be of the removable type so that it may be positioned in any of the openings 12 of the cross bar to adjust the length of the cross bar, should it be desired to use the tool in removing the brake shoe springs of large brakes. However, it might be stated that as for general use, it will be unnecessary to adjust the cross bar for length.

As clearly shown by the drawing, a hook 10 is provided at each end of the cross bar. This construction permits the tool to be positioned over either of the brake shoes, for convenience in operation by either a right-handed or left-handed person.

The bar 14, as shown by Figure 3 of the drawing, may be used in lieu of the cross bar 9, shown by Figs. 1 and 2. In this form of retaining bar, the lug 15 is formed adjacent to the inner end of the bar 14, the lug 15 being adapted to be positioned in the opening of the brake shoe in which the hold down spring cap bolt 16 is mounted and which is removed when it is necessary to repair the brake. Thus it will be seen that the bar and tool will be thereby securely held in position against slipping, during the operation of the tool.

In operation, the hook at one end of the cross bar 9 is positioned over one edge of a brake shoe as indicated by Figure 1 of the drawing, and the tool is now moved so that the free end of the bar beyond the cross bar, may be moved under the spring, engaging the hook at the end thereof. The handle is now operated to expand the spring to a position so that the hook of the spring may be readily elevated or lifted from the opening in the brake shoe in which it is held. Because the spring is firmly held within the notch at the end of the extension 7, the spring will be held against accidental displacement with respect to the tool during the removing or replacing operation.

When it is desired to use the tool in replacing a brake shoe spring, the hook at one end of the spring is positioned in the opening of one of the brake shoes, and the tool is positioned in a manner so that the hook at the opposite end of the spring rests in a notch of the offset end of the bar. The handle is now operated to stretch the spring so that the hook which is held by the tool, will overlie the opening in the adjacent brake shoe. By slightly tilting the tool forwardly, the hook will engage within the opening of the brake shoe, and the tool may be then removed. Both ends of the spring are now held in the openings of adjacent brake shoes, as shown by Figure 1 of the drawing.

What is claimed is:

A tool for removing and replacing brake shoe springs comprising, an elongated handle, an offset portion connected at one end to the end of said handle with the offset at substantially right angles to the handle, an end portion connected to the other end of said offset portion extending away from said handle and at substantially right angles to said offset, said handle offset and end portions lying in a single plane, a spring engaging notch in a side edge of the end portion near the free end thereof, a flat bar pivotally mounted on and in substantially the same plane as said end portion adjacent to and at right angles to the offset portion, a U-shaped hook formed on the end of the bar at right angles to the bar, the inner connected leg of the hook extending in the same direction as the offset from the plane of the bar and said end portion, and the open end of the hook facing in the opposite direction, said hook adapted to fit over a brake shoe and its adjacent lining to anchor the bar when the handle is pivoted relative to the bar whereby the spring engaged in the notch is tensioned for removal or replacement.

JACOB C. FEINGOLD.

REFERENCES CITED

The following references are of record in the file of this patent:

UNITED STATES PATENTS

| Number | Name | Date |
| --- | --- | --- |
| 1,268,480 | Lockwood | June 4, 1918 |
| 1,323,476 | Ingram | Dec. 2, 1919 |
| 1,862,326 | Altice | June 7, 1932 |
| 1,938,102 | Hill | Dec. 5, 1933 |
| 1,953,930 | Dyal | Apr. 10, 1934 |

FOREIGN PATENTS

| Number | Country | Date |
| --- | --- | --- |
| 292,803 | Great Britain | June 28, 1928 |